J. C. SANTON.
BORING TOOL HOLDER.
APPLICATION FILED APR. 19, 1919.
1,397,786.
Patented Nov. 22, 1921.
2 SHEETS—SHEET 1.
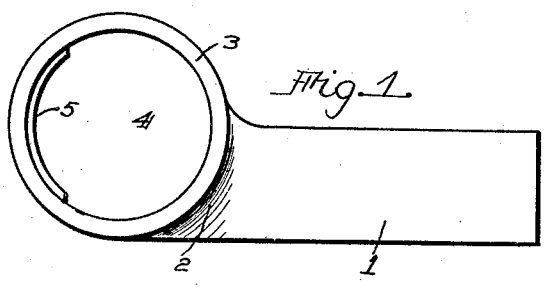
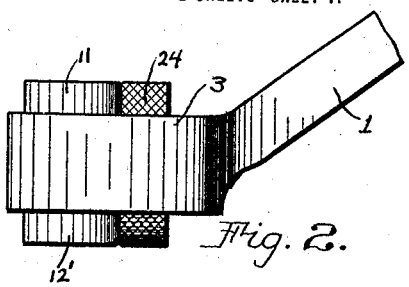
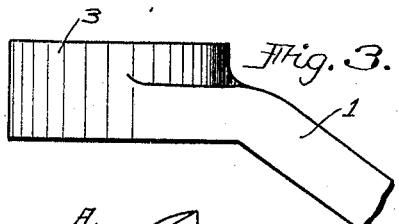
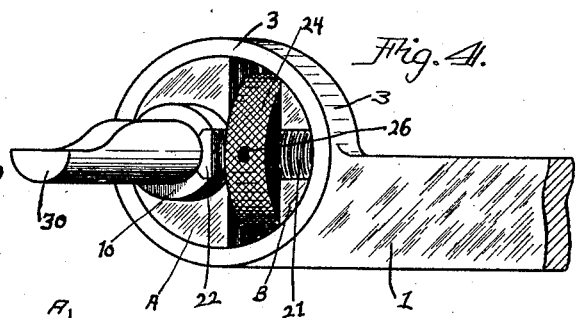
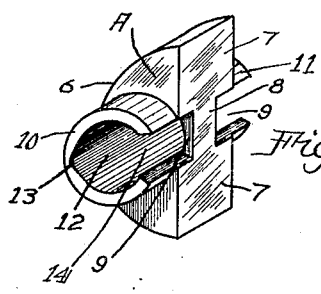
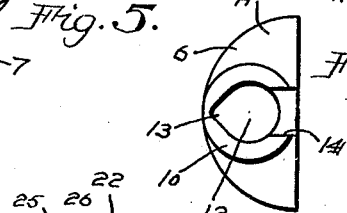
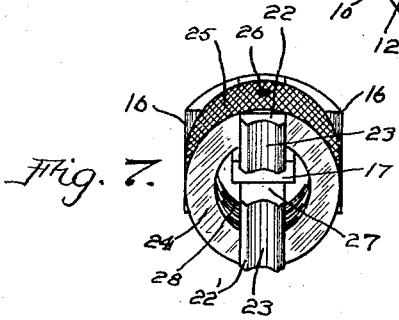
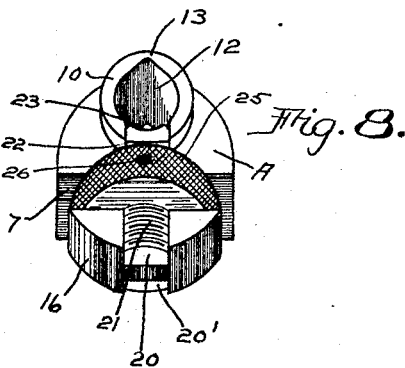
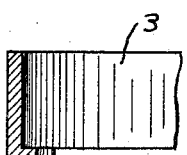
INVENTOR.
Joseph C. Santon
BY
William E. Baff, ATTORNEY.

J. C. SANTON.
BORING TOOL HOLDER.
APPLICATION FILED APR. 19, 1919.
1,397,786.
Patented Nov. 22, 1921.
2 SHEETS—SHEET 2.
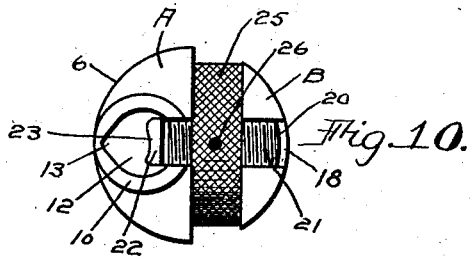
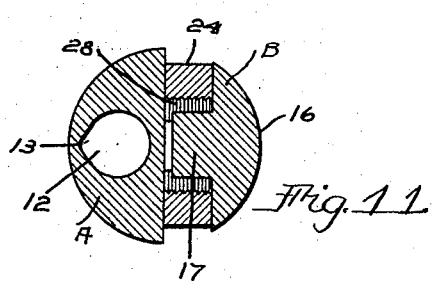
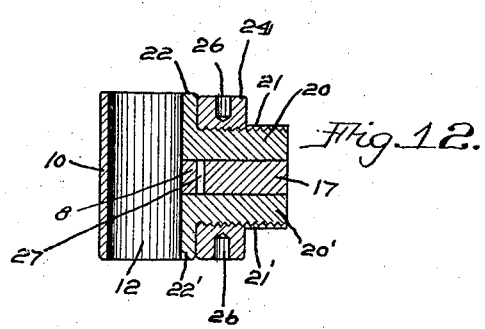
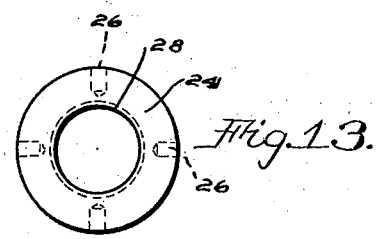
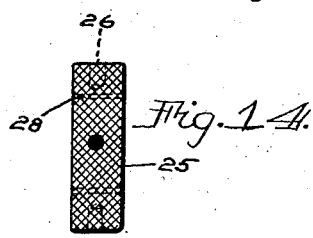
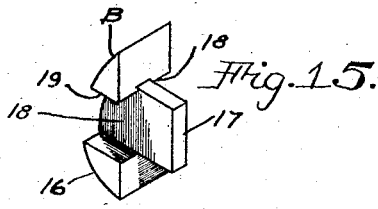
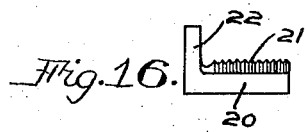
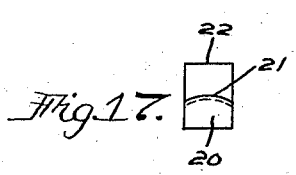
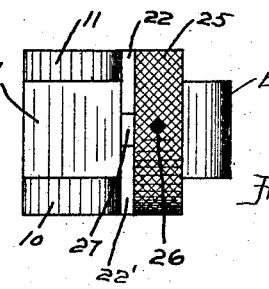
INVENTOR.
Joseph C. Santon
BY
William E. Baff  ATTORNEY.

UNITED STATES PATENT OFFICE.

JOSEPH C. SANTON, OF WORCESTER, MASSACHUSETTS.

BORING-TOOL HOLDER.

1,397,786. Specification of Letters Patent. Patented Nov. 22, 1921.

Application filed April 19, 1919. Serial No. 291,342.

*To all whom it may concern:*

Be it known that I, JOSEPH C. SANTON, a citizen of the United States of America, residing at the city of Worcester, in the county of Worcester and State of Massachusetts, have invented new and useful Improvements in Boring-Tool Holders, of which the following is a specification.

This invention relates to improvements in tool holding devices and is especially adapted for use in connection with boring tools designed for drilling purposes.

One of the objects of my invention is to provide a simple, inexpensive and highly efficient device of this character which enables a tool to be accurately locked in radial position within the holder at any adjusted point.

A further object of my invention is to provide a boring tool holder with effective means for clamping tools of varying diameters said means also serving to clamp the tool in any radial position in the holder in which it may have been set.

A still further object of my invention is to provide a boring tool holder in such a manner that a single member may be operated for the purpose of securing tools of varying diameter within the holder and locking the tool itself in any adjusted position within the holder.

A still further object of my invention is to provide a tool clamping device adapted to be rotatably adjusted within a supporting holder, unitary manually-controlled means being supplied for simultaneously locking the device in adjusted position and permitting the device to clamp tools of varying diameter.

The leading characteristic of my invention is compactness in size whereby all the parts of the holder are self-contained and fool proof, simplicity of construction by virtue of which the fullest measure of service is extracted from each part, and ease of separation whereby time is saved in using this tool due to the fact that the operator, after inserting the tool in the clamping device and moving the device in the holder to the position desired, simply turns a nut and is able to lock the device against movement and displacement from the holder, and at the same time lock the tool against displacement from the device.

With the above and other objects in view my invention consists in the combination, arrangement and details of construction disclosed in the drawings and specification and then pointed out in the appended claims.

In the drawings wherein similar reference characters designate similar parts throughout the respective views—

Figure 1 is a side elevation of the holder.

Fig. 2 is a bottom plan view thereof, showing all the parts.

Fig. 3 is a top plan view of Fig. 1.

Fig. 4 is a side elevation of my invention showing all the parts in proper position therein.

Fig. 5 is a perspective view of the tool clamping portion of my invention.

Fig. 6 is a side view of Fig. 5.

Fig. 7 is a perspective view of other parts of my invention showing the clamping jaws, and actuating means therefor.

Fig. 8 is a perspective view of all the parts of my invention properly assembled in position and particularly showing the follower portion thereof.

Fig. 9 is a fragmental detail view of the housing.

Fig. 10 is a side elevation of the movable parts of my invention.

Fig. 11 is a longitudinal section taken through Fig. 10 centrally thereof and at one side of the jaws.

Fig. 12 is a horizontal section of Fig. 10.

Fig. 13 is an elevation of an actuating nut to be described.

Fig. 14 is an end elevation of Fig. 13.

Fig. 15 is a perspective view of the follower to be described.

Fig. 16 is a side elevation of one of the clamping jaws.

Fig. 17 is an end elevation of Fig. 16, and

Fig. 18 is a top plan view of Fig. 10 with the parts slightly separated.

Referring to the drawings which are merely illustrative of my invention 1 designates a supporting arm or shank for the tool holder to be described and is adapted to be locked in the usual manner in the post hole of a lathe carriage as is well understood by those skilled in the art. A cylindrical hollow body or collar 3 serving as a housing for the tool clamping device to be described is formed upon said supporting arm at an angle as at 2 to said arm 1 as is shown in Figs. 2 and 3. The collar 3 provides a cylindrical opening 4. An arcuate flange 5 shown in Figs. 1 and 9 is formed at one side of the holding collar 3 and projects into the opening 4 for a purpose to be described.

A cylindrical body is adapted to snugly fit the opening 4 of the collar 3 and to set against the flange 5 thereof so as to be held against lateral displacement therefrom in one direction. This cylindrical body is composed of two oppositely extending bearing blocks having outer arcuate faces, the arrangement being such that said cylindrical body will be rotatably adjustable within the collar 3 and is made up of two sector shaped sections or members A and B shown respectively in Figs. 6 and 15, suitably connected together in a manner to be explained and held together by virtue of the snug fit the completed cylindrical body has in the collar 3. The sector shaped sections or bearing blocks A and B fit the collar 3 flush with the opposite sides thereof.

I will first describe the construction of the bearing block A. This block is sector shaped in construction having an outer arcuate face or side 6 and a flat front side 7 reduced in width centrally as at 8 so as to provide a ledge bounded on opposite sides by means of the recesses 9. A pair of tubular portions or extensions 10 and 11 are formed upon opposite sides of the bearing block A and project outwardly therefrom and are connected for communication by an opening formed through the center of and transversely in said bearing blocks, the longitudinal passage thus formed being broadly designated 12. The inner wall of this passage 12 is formed with a preferably V shaped notch 13 and diametrically opposite to said notch 13 and disposed on opposite sides of the reduced portion 8 are located recesses 14 formed upon the tubular extension 10 and forming prolongations of the recesses 9.

Adapted to project into the registering recesses 9 and 14 and transversely of the bearing block, are the tool engaging or biting portions or heads 22 and 22' formed upon a pair of substantially L shaped jaws 20 and 20' (see Figs. 7, 8, 12, and 18) having their shank portions formed longitudinally with screw threads 21 and 21' formed convex in cross section, said shanks projecting into a guiding member serving as a jaw actuating means and composed of a cylindrical hollow nut 24 and the follower or bearing block B. The recesses 9, 14 in bearing block A form guides for the clamping jaws 20 and 20' and the lateral recesses 18 formed in the sector-shaped bearing block B form coöperating guides for the same jaws 20 and 20' the threads of which mesh with the internal threads 28 (Figs. 7 and 11) formed upon the actuating collar or nut 24 at diametrically opposite points thereof whereby an intervening space 27 (Figs. 7, 12, 18) exists between these jaws into which projects the tongue 17 which extends forwardly and centrally of bearing block B. It will thus be seen that the tongue 17 also enters the actuating nut 24 as shown in Figs. 7, 11 and 12 and serves to spread apart the jaws and hold them in mesh with the threads 28 of this nut. The nut 24 is formed with circumferentially spaced apart tool receiving notches 26, and is knurled as at 25 upon its outer circumference so as to prevent the operator's fingers from slipping when in engagement therewith. It will be seen that the portion 8 of the bearing block in addition to bracing the split tube 10, 11 (Fig. 5) also serves to maintain the pair of jaws 20 and 20' apart as shown in Fig. 12 and is of equal width relatively to the tongue 17 of bearing block B.

The parts are all shown assembled in Fig. 4 within the housing or collar 3. The opening 12 is made to receive boring or similar tools or tool shanks 30 and is made large enough to serve a tool holder for clamping tools of varying thicknesses or diameters owing to the fact that the jaw heads 22 and 22' are adapted to move into the opening 12 as shown in Fig. 10, this representing its expansible or adjusted position. The circular knurled nut 24 serves to actuate the jaws 20 and 21 and also serves to spread apart the oppositely arranged sector-shaped bearing blocks A and B so as to crowd or bind them at the same time against diametrically opposite sides of the collar 3. The operator places a boring tool within the holder opening 12, and with the parts all arranged as shown in Fig. 4, turns the knurled nut 24. It will be noticed from Fig. 2 that the tubular portions 11 and 12' project from opposite sides of the collar 3 and that the nut 24 is adapted to rotate at right angles with respect to the axis of collar 3 and also projects from opposite sides thereof so as to provide hand gripping surfaces. By turning the nut 24 in the proper direction it will be seen that the bearing block B will back up against the interior wall of collar 3 as soon as the jaws have moved rectilinearly far enough to engage the tool seated in the tool holder or opening 12, and thereupon on further turning the nut 24 the jaw head 22 and 22' will press the tool against bearing block A and will press this bearing block itself against the wall of collar 3. The nut 24 will continuously be turned by hand, or by means of a metal pin inserted within any of its openings 26 (so as to obtain increased leverage), until it cannot turn any more, and the moment bearing block A ceases to move in one direction the nut 24, on further turning will drive the follower or bearing block B against the interior wall of the collar 3, causing it to bind and impinge frictionally thereagainst, thus locking the opposing arcuate faces 6 and 16 of bearing blocks A and B frictionally against the inner circumference of this collar throughout the entire extent of the frictional surface exposed of these arcuate faces. It will be found in actual service that with the parts thus locked, it will be difficult if not impossible for the tool, under the vise like action of the jaw heads 22 and 22', to work loose or slip. Normally, the nut 24 can be turned long enough to force the heads 22 and 22' of the jaws 20 and 20' to advance in the opening 12 far enough to press the bearing blocks A and B in opposite direction so as to lock them against movement within collar 12. The gripping faces of the jaws 20 and 20' are formed concave so as to hold a tool therein to better advantage. Similarly in case of a tool of very small diameter, the same will fit simply within the V-shaped notch 13. The V-shaped notch 13 and concave notch 23 provide a three point engaging clamp for tools of various diameters. The flange 5 holds the blocks A and B when properly assembled, against lateral displacement from the collar in one direction while the frictional lock provided for these blocks prevents them from becoming displaced in an opposite direction.

By means of the present invention there is provided a simple, compact boring tool holder having no fastening parts projecting from the holder that are likely to catch against possible obstructions and wherein a single actuating member will lock a tool of a determinate size within the holder and lock the tool carrier also in any adjusted radical position. Numerous modifications may be resorted to in practice without departing from the details of my invention herein disclosed.

What I desire to protect and claim by Letters Patent is:—

1. A device as described consisting of a cylindrical hollow body, a cylindrical body rotatably adjustable therein, a rectilinearly traveling tool clamping member arranged in said body, and actuating means engaging said clamping member and adapted to lock said rotatably adjustable body and at the same time to actuate said clamping member.

2. A device as described consisting of a cylindrical hollow body, a cylindrical body rotatably adjustable therein, and composed of oppositely movable sector shaped portions adapted to be crowded against the interior wall of said hollow body so as to be locked against movement, a rectilinearly movable tool clamp engaging both sections and means engageable with said tool clamp adapted to actuate the latter and also to lock said sections.

3. In a device as described, in combination, a cylindrical hollow body, a cylindrical body rotatably mounted therein and composed of two sections, each sector shaped, a rectilinearly movable device carried by said body and serving as a tool clamp and also as a means of locking said sector shaped sections fast against said hollow body and manually controlled means for actuating said device.

4. In a device as described, in combination, a cylindrical hollow body, a cylindrical member rotatably mounted therein, and consisting of opposing sector shaped sections rectilinearly movable means connecting said sector shaped sections together, a tool clamping portion carried by said means for clamping tools of different sizes, and manually controlled means coöperating with said means whereby said sector shaped sections may be forced apart so that they may clamp opposite points of said hollow body.

5. In a device as described, in combination, a cylindrical hollow body, a sector shaped member fitting snugly therein, a tubular portion formed through said member and projecting from opposite sides thereof, said tubular member having a longitudinal recess, a clamping member adapted to advance in said recess so as to clamp tools, means for guiding said clamping member, and means for simultaneously clamping said sector shaped member and actuating said clamping member.

6. A device as described consisting of a collar having a positioning shank, a bearing block fitting said collar, a tool holding arrangement on said block, a jaw coöperating with said tool holding arrangement and movable in one direction to clamp a tool in said holder and said block itself against the interior side of the collar, and means interposed between said block and the opposite side of the collar and adapted to actuate said jaw.

7. A device as described consisting of a collar having a positioning shank, a cylindrical body bodily rotatable therein so as to be adjustably positioned, said body composed of oppositely arranged sections having outer arcuate sides adapted to engage opposite sides of said collar, a tubular opening formed through one of said sections for the reception of tools of varying diameter and interconnected members arranged in said collar, one of said members adapted to bear against one section and the other member adapted to enter said tubular portion and bear against a tool therein, the actuation of one member causing the actuation of the other member.

8. In a device as described, in combination opposing sector shaped members, a collar incasing the same, both members being formed on opposite sides with guide recesses, a pair of clamping jaws slidably mounted in said recesses, one of said members having a tool receiving opening with which said recesses communicate, and means for actuating said clamping jaws to move them into the opening of one member and also bearing against the other member.

9. In a device as described, in combination, opposing sector shaped members, a collar incasing the same; a tool holding member carried by one of said members, a pair of threaded jaws adapted to secure a tool within said holder the other sector shaped member being formed with recesses in which said jaws are guided in movement, an internally threaded collar serving as a nut for actuating said jaws, said jaws projecting into said threaded collar in spaced relation, and a projection on the recessed member entering said threaded collar and adapted to spread said jaws apart therein so that the latter may mesh with the teeth of said threaded collar.

10. In combination, a tool clamp having a bearing block and a movable jaw, a holder in which said tool clamp is adjustable bodily, said jaw opening to receive tools of varying diameter, means for locking said clamp in fixed position, and means acting in time with said locking means for actuating the jaw to rigidly secure a tool in said clamp.

11. In combination, a tool clamp having a bearing block and a movable jaw, a housing for said tool clamp, said clamp being movably guided to different positions in said housing, and means for simultaneously actuating said movable jaw and locking said clamp in set position.

12. In combination, a tool clamp having a bearing block and a movable jaw, a housing means for locking said clamp within said housing, said clamp when unlocked adapted to be movably adjusted in position, and means controlled by said other means for actuating said movable jaw.

13. In combination, a tool clamp having a bearing block and a movable jaw, a housing in which said clamp is movably guided, a jaw operating device arranged laterally of said clamp, and a member carried by said device backing up against one wall of said housing when said device is actuated, said device thereupon serving to transmit pressure against said clamp to frictionally bind it against said housing.

14. In combination, a tool clamp having a bearing block and a jaw movable within said bearing block, a housing, means for clamping the tool proper within said housing, and means actuated by the first named means adapted to operate said jaw to clamp varying sizes of tools.

15. In combination, a tool clamp having a bearing block and a jaw movable within the latter, a housing within and against one side of which said clamp bears, and means for operating the movable jaw having an extensible part backing up against the opposite side of the housing for the purpose of pressing said clamp in frictional locking engagement with said housing.

16. In combination a housing a tool clamp therein having a bearing block and a movable jaw adapted to bind tools of varying sizes against the bearing block and said clamp itself against said housing, and rotatable means for actuating said jaw.

17. In combination a collar having a supporting arm, a tool holding device rotatably mounted in said collar, means preventing the displacement of said device in one direction from said housing, said device consisting of two clamping portions spaced diametrically from each other, a tool clamp carried by one of said clamping portions including a movable jaw, and manually controlled means for actuating said jaw first and said clamping portions last whereby the latter will bindingly lock against said housing.

18. A device of the character described, comprising a cylindrical holder member, a rotatable body therein, a bearing block, jaws carried by said bearing block and means for moving said jaws and block in opposite directions, whereby the whole will be locked in fixed position.

19. A device as described, consisting of a cylindrical holder member, a cylindrical body rotatably adjustable therein, comprising a tool holder projecting laterally of said holder member and a bearing block, means adapted to clamp tools of varying diameters in said holder and a rotatable member adapted to actuate the last named means.

In witness whereof I have hereunto set my hand and affixed my seal this 12th day of April, 1919.

JOSEPH C. SANTON.

Attested:
 WILLIAM E. BAFF,
 ALFRED D. HARRINGTON.